United States Patent [19]

Nonaka

[11] Patent Number: 5,746,469
[45] Date of Patent: May 5, 1998

[54] APPARATUS FOR COVERING WINDSHIELD OF VEHICLES

[75] Inventor: Tokio Nonaka, Kyoto-fu, Japan

[73] Assignee: Shigenobu Tuda, Osaka-fu, Japan

[21] Appl. No.: 710,467

[22] Filed: Sep. 18, 1996

[30] Foreign Application Priority Data

Jan. 12, 1996 [JP] Japan ................................ 8-021964

[51] Int. Cl.[6] ............................................. B60J 3/00
[52] U.S. Cl. ..................... 296/97.7; 296/97.4; 296/97.8
[58] Field of Search ................................ 296/97.7, 97.4, 296/97.8

[56] References Cited

U.S. PATENT DOCUMENTS

| | | | |
|---|---|---|---|
| 2,345,106 | 3/1944 | Erps | 296/97.4 X |
| 3,770,313 | 11/1973 | Jimenez | 296/95.1 |
| 4,898,224 | 2/1990 | Woodworth | 296/97.8 X |
| 4,932,711 | 6/1990 | Goebel | 296/97.7 |
| 5,044,686 | 9/1991 | Acenbrack | 296/97.7 |
| 5,551,744 | 9/1996 | Liao | 296/97.4 |

*Primary Examiner*—Joseph D. Pape
*Attorney, Agent, or Firm*—Lowe, Price, LeBlanc & Becker

[57] ABSTRACT

There is provided an apparatus for shading inside of a car from the sun in summer, and preventing the windshield from being frozen due to frost or the like in winter. The apparatus is free from disadvantages of being blown away by the wind, being stolen, obstructing driver's sight at the time of driving the car or occupying a large space inside the car. The apparatus comprises a mounting plate located on reverse side of a bonnet; a cover capable of being unfolded and folded vertically. Accommodating holders are attached to the front end of the mounting board for accommodating the cover when folded. An elongated, flexible slide arm is fixed to a front end of the cover and is supported for performing freely reciprocating motion in longitudinal direction to move linearly along the external surface of the windshield and upper side of said mounting place. Arm drives are fixed to the mounting plate. A switch for driving the arm is located inside of the car.

3 Claims, 4 Drawing Sheets

APPARATUS FOR COVERING WINDSHIELD OF VEHICLES

BACKGROUND OF THE INVENTION

1. Field of the Invention

The present invention relates to an apparatus for covering a windshield of vehicles for the purpose of shading inside of a car from the sun in summer, and preventing the windshield from being frozen due to frost or the like in winter.

2. Prior Art

In summer, temperature inside a car parked somewhere outside comes to reach as high as 80° C., and it is rather troublesome or dangerous for a driver to handle a steering wheel heated up to such a high temperature. Furthermore, it is often the case that the high temperature may deteriorate or deform things put in the car. On the other hand, in winter, the windshield may be often frosted, or ice particles frozen after thawing of snow may stick to the windshield. As a result, it takes a long time to start the car after starting an engine.

Several attempts have been heretofore proposed mainly to shade a rear windshield from the sun. However, as for the front windshield of largest inclination and large area, there have been conventionally proposed only few products made of cardboard or resin board formed into an accordion-like shade, which is manually unfolded for covering the windshield.

Such a conventional shade made of cardboard or resin board formed like accordion may be blown away by wind or stolen when it is put outside the windshield. On the other hand, if putting it inside, it doesn't shade sufficiently the windshield from the sun because it is difficult to keep such an accordion-like board in a standing posture along the windshield. Moreover, the conventional shade may be said a useless and obstructive thing during driving because there is no sufficient space to keep it inside the car.

In case of rear windshield, it is possible to dissolve frost and/or ice particle in rather short time by means of electrical heating wires disposed on the rear windshield. On the contrary, it is impossible to dispose any heating wire on a front windshield because such a wire obstructs the driver's sight. Thus, there has been heretofore no effective measure to cope with frost and freezing in winter.

The present invention was made to solve the above-discussed problems and has an object of providing an apparatus for covering a windshield of vehicles which is capable of performing functions of shading the sun in summer and of preventing the windshield itself from being stuck by frost or ice in winter, and which is free from the disadvantages such as being blown away by the wind, being stolen, obstructing driver's sight at the time of driving the car or occupying a large space inside the car to the extent of obstructing the driving.

To accomplish the foregoing object, an apparatus for covering a windshield of vehicles of the present invention comprises: a mounting plate located on reverse side of a bonnet and fixed to a body; a cover capable of being unfolded and folded vertically on the windshield of a car, and which is large enough to cover most part of the windshield when unfolded; an accommodating section attached to front end of said mounting plate for accommodating said cover when folded; a slide arm which is elongated along vertical direction of the windshield and formed of a flexible material, of which front end is fixed to a front end of said cover, and which is supported for performing reciprocating motion freely in longitudinal direction to move linearly along external side of the windshield and upper side of said mounting plate; arm drive means fixed to said mounting plate for moving said slide arm linearly in reciprocating motion; and a switch for driving said arm drive means from inside of the car.

It is preferable that the mentioned arm drive means of the apparatus for covering a windshield of vehicles comprises: a transmission disk comprising a frictional transmission roller section and a rotary gear section, said frictional transmission roller section being rotatably supported on upper side of the mounting plate so that the upper side of the mounting plate may be orthogonal to the axis of frictional transmission roller section, periphery of the frictional transmission roller section being in contact and engaged with a part of the slide arm, and said rotary gear section being formed coaxially and integrally with said frictional transmission roller section; a screw gear being engaged with said rotary gear section of the transmission disk; and a motor for driving said screw gear to turn forwardly and reversely (clockwise and counterclockwise).

It is also preferable that the apparatus for covering a windshield of vehicles further comprises a pair of limit switches for stopping the arm drive means respectively acting at unfolded and folded positions.

When operating the switch from inside the car, the arm drive means are driven, and the slide arm is linearly moved along the upper side of the mounting plate as well as along the external side of the windshield, whereby front end of the slide arm moves toward upper part of the windshield. At this time, the slide arm being made of a flexible material moves along the curved surface of the windshield. With the movement of the slide arm, the cover to the front end of which front end of the slide arm is fixed is gradually unfolded. In this manner, most part of the external side of the windshield comes to be covered by the cover. Accordingly, in summer, inside of the car is shaded by the cover from the sun beam, and quantity of light incident into the car through the windshield is reduced, whereby inside the car is prevented from sharp temperature rise. As a result, there are no more such disadvantages as hot steering wheel heated to a high temperature of making it difficult to touch it, hot things put inside the car heated to a high temperature of deforming or deteriorating themselves. In winter, the windshield is prevented from being frosted over and from being stuck by ice particles. As a result, it takes a short time to start the car after starting the engine thereof.

At the time of driving the car, by operating the switch from inside the car, the arm drive means are driven reversely, and the slide arm is linearly moved along the external side of the windshield as well as along the upper side of the mounting plate, whereby front end of the slide arm moves toward lower part of the windshield. With the movement of the slide arm, the cover to the front end of which front end of the slide arm is fixed is gradually folded. In this way, the cover is removed from outside of the windshield, and the folded cover is accommodated in the accommodating section attached to the front end of the mounting plate disposed on the back side of the bonnet of the car. As a result, neither the driver's sight directed through the windshield is obstructed by the cover, nor the cover accommodated on the back side of the bonnet of the car as described above is obstructive during driving. Thus, the windshield covering apparatus is free from such disadvantages as being blown away by the wind, being stolen, obstructing driver's sight at the time of driving the car or occupying a large space inside the car to the extent of obstructing the driving.

The motor is driven forwardly or reversely (clockwise or counterclockwise), whereby the screw gear is driven forwardly or reversely (clockwise or counterclockwise), and the turning force of the screw gear is transmitted to the transmission disk having the rotary gear section engaged with the screw gear, thereby the transmission disk being driven forwardly or reversely (clockwise or counterclockwise). As a result, the slide arm being in contact and engaged with the periphery of the frictional transmission roller section is linearly reciprocated by frictional transmission. Since the arm drive means are simply formed of the motor, screw gear and transmission disk, it is possible to accommodate the apparatus compactly on the backside of the bonnet of the car.

Each limit switch acts at the unfolded and folded positions of the cover, whereby the arm drive means are stopped, and the slide arm does not move over the unfolded and folded positions of the cover. Accordingly, the slide arm is prevented from getting out or dropping out, resulting in prevention of equipment of the car from being damaged.

Other objects, features and advantages of the invention will become apparent in the course of the following description with reference to the accompanying drawings.

DESCRIPTION OF THE PREFERRED EMBODIMENT

An embodiment according to the present invention is hereinafter described with reference to the accompanying drawings.

Figure 1:
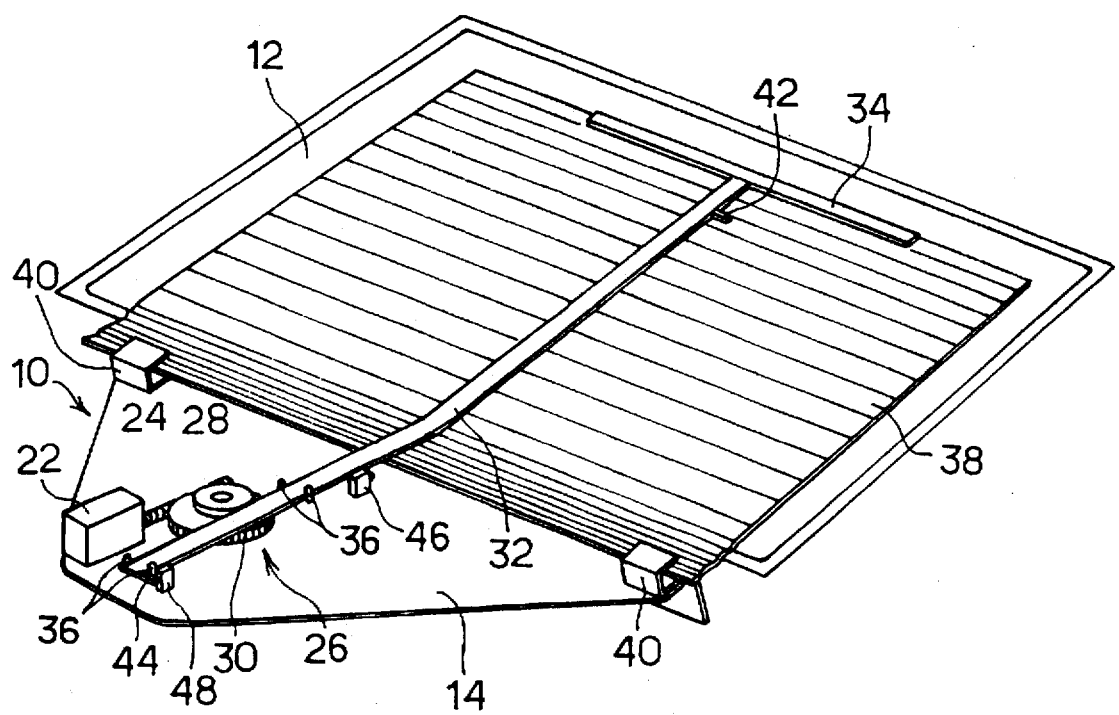
FIG. 1 is a perspective view of an apparatus for covering a windshield of a car showing an embodiment of the present invention, i.e., a view of the apparatus seen from obliquely above with bonnet omitted and showing the cover in an unfolded state.
Figure 2:
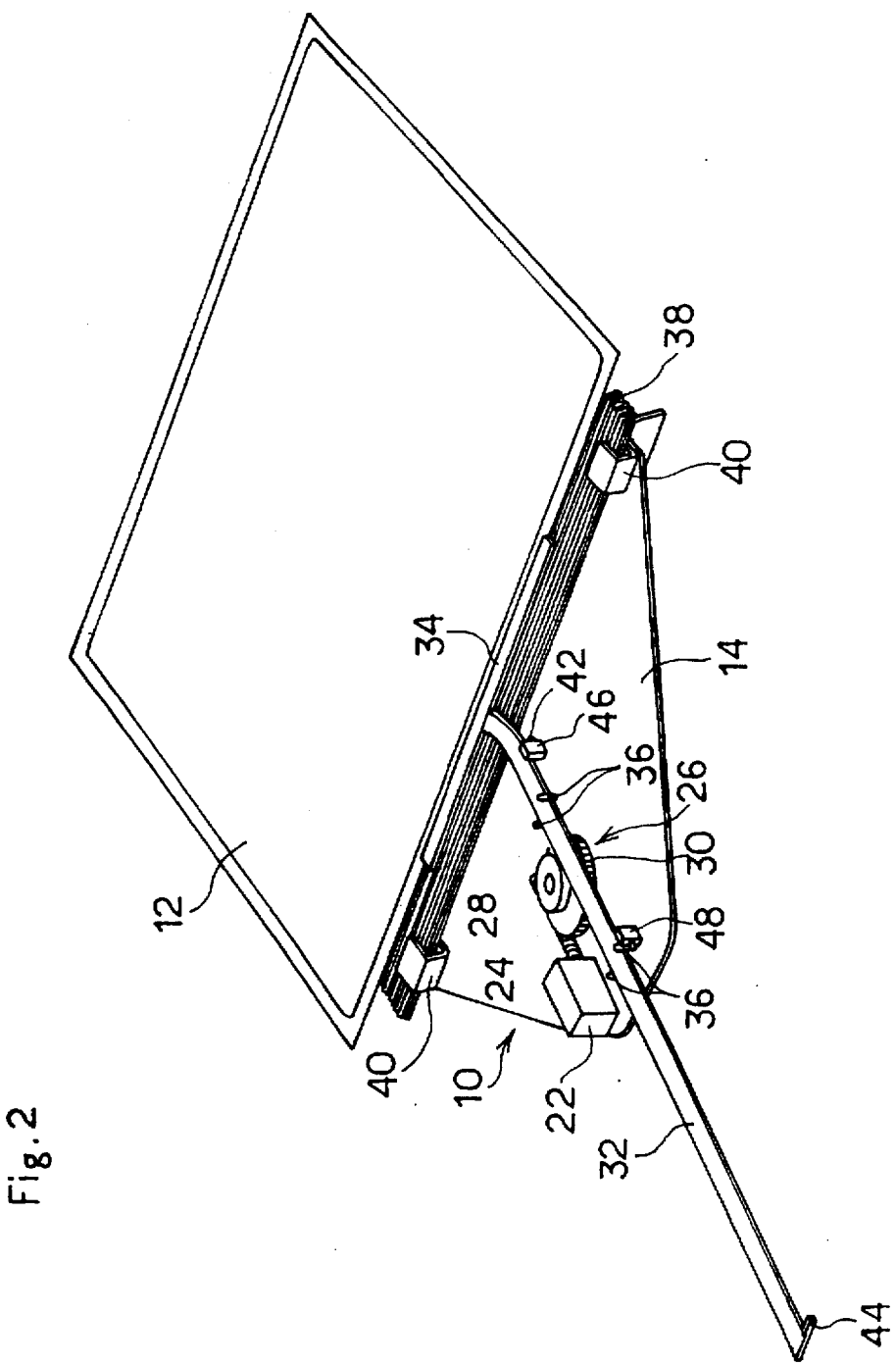
FIG. 2 is a view of the apparatus showing the cover in a folded state.

FIGS. 1 and 2 are perspective views of an apparatus for covering windshield of a car showing an embodiment of the invention, and in which FIG. 1 is a view of the apparatus seen from obliquely above with bonnet omitted and showing the cover in an unfolded state, and FIG. 2 is a view of the apparatus showing the cover in a folded state, respectively.

Figure 3:
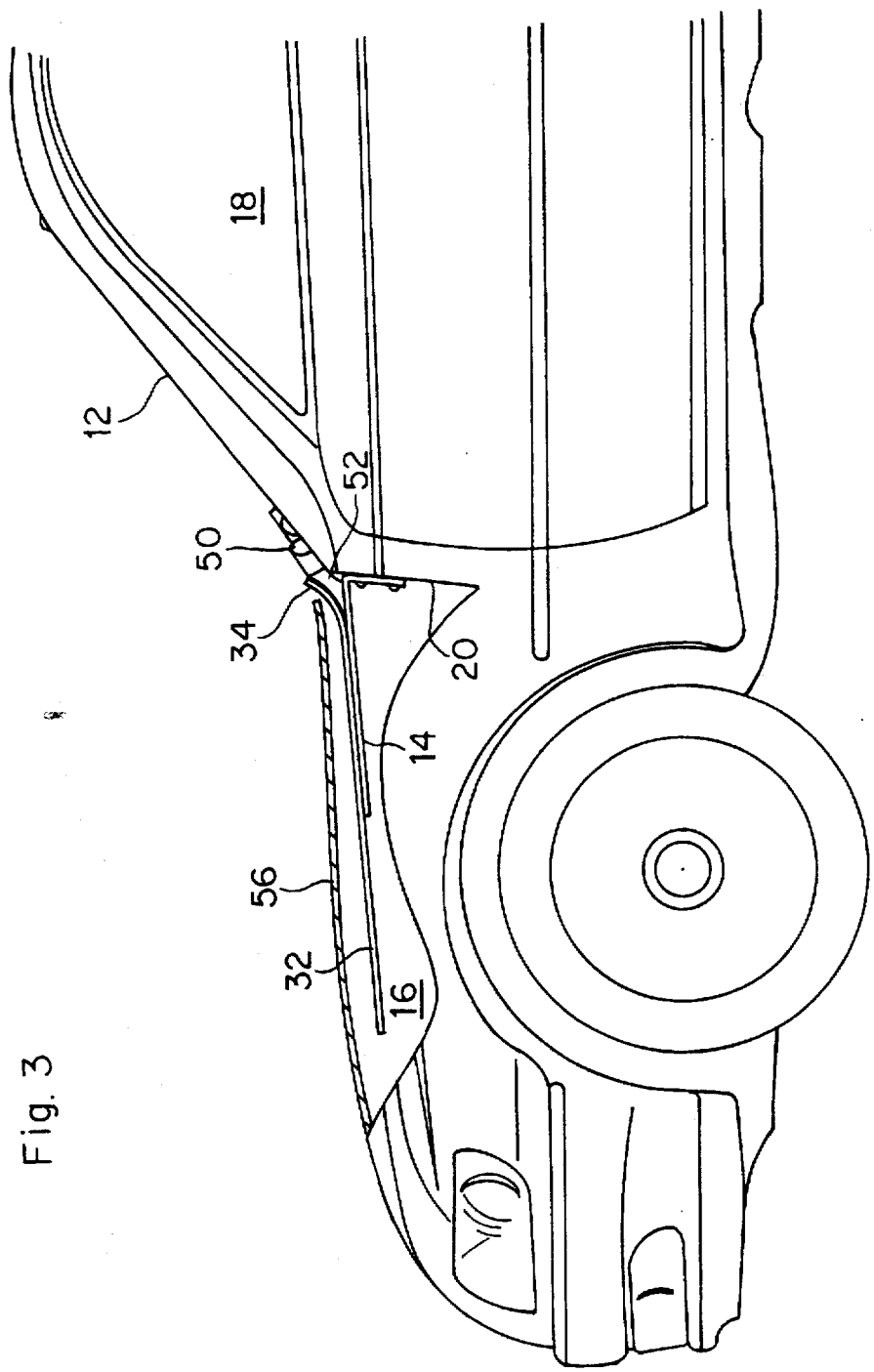
FIG. 3 is a schematic side sectional view of the windshield and other parts near the windshield.

The windshield covering apparatus 10 is disposed and accommodated in the lower part of the windshield 12 of the car, i.e., on the back side of a bonnet 56, illustrated in FIG. 3. The covering apparatus 10 is formed by mounting various components on the mounting plate 14. As shown in FIG. 3 illustrating a schematic side sectional view of the windshield and other parts near the windshield, the mounting plate 14 is fixedly disposed by screwing or welding onto a wall side 20 which separates an engine room section 16 from a driving room section 18 so as to form a small gap on back side of the bonnet 56.

A motor 22 capable of rotating forwardly and reversely (clockwise and counterclockwise) is fixed onto the mounting plate 14, and a screw gear 24 is fixed to the rotary shaft of the motor 22. A transmission disk 26 is mounted on the mounting plate 14, and the transmission disk 26 is disposed so that the upper side of the mounting plate 14 may be orthogonal to the axis of the transmission disk and is rotatably supported. The transmission disk 26 is formed into one unit comprising a frictional transmission roller section 28 being formed into a disk of rubber material and a rotary gear section 30, and the frictional transmission roller section 28 and the rotary gear section 30 turns coaxially together. The rotary gear section 30 of the transmission disk 26 and the screw gear 24 are engaged with each other. When the screw gear 24 is driven by the motor 22, a turning force is transmitted to the transmission disk 26, whereby the transmission disk 26 is rotated.

An elongated slide arm 32 extending along the vertical direction of the windshield 12 is disposed across the middle part of the mounting plate 14, and a horizontal rod 34 extending along the horizontal direction of the windshield 12 is integrally formed with the front end of the slide arm 32. The slide arm 32 is formed of a flexible material such as plastic, hard rubber, etc., and may be deformed along the external side of the windshield 14 as well as along the upper side of the mounting plate 14. The slide arm 32 is supported by a plurality of guide rollers 36 in longitudinal direction so as to reciprocate freely, and these plurality of guide rollers 36 form plural pairs thereof in horizontal direction and the respective pairs of guide rollers 36 are rotatably disposed at plural positions on the mounting plate 14. A part of the slide arm 32 is in contact and engaged with the periphery of the frictional transmission roller 28 of the transmission disk 26. When rotating the transmission disk 26, a driving power is transmitted to the slide arm 32, and the slide arm 32 being guided by the guide rollers 36 moves linearly along the external side of the windshield 12 as well as along the upper side of the mounting plate 14.

Front end of the cover 38 is fixed to the horizontal rod 34 attached to the front end of the slide arm 32. The cover 38 is formed so as to be unfolded and folded in vertical direction of the windshield 12. For example, the cover 38 is formed either of plural strip-like plastic plates connected one by one to form an accordion-like member as a whole, or of thread-like resin formed into a fiber member. The cover 38 has a size sufficient to cover most part of the windshield 12 when unfolded as illustrated in FIG. 1. A pair of accommodating holders 40 are horizontally fixed to the front end of the mounting plate 14 so that the cover 38 may be held in the holders 40 and accommodated compactly on the back side of the bonnet so as not to be seen from outside when the cover 38 is folded as illustrated in FIG. 2.

The slide arm 32 is integrally provided with projections 42, 44 respectively on front and rear ends thereof. Limit switches 46, 48 are respectively fixed onto the mounting plate 14 at the locations near front and rear ends thereof. Thus, as illustrated in FIG. 1, when unfolding the cover 38, the projection 44 located at the rear end of the slide arm 32 comes in contact with the limit switch 48 to put it into action. On the other hand, as illustrated in FIG. 2, when folding the cover 38, the projection 42 located at the front end of the slide arm 32 comes in contact with the limit switch 46 to put it into action.

In addition, as illustrated in FIG. 3, a wiper 50 is attached to the lower end area of the windshield 12, and the wiper 50 is projecting from the external side of the windshield 12. Therefore, for the purpose of not engaging the horizontal rod 34 of the slide arm 32 with the wiper 50 at the time of unfolding the cover 38, a protecting member 52 is disposed on the lower end side of the windshield 12. As a result, at the time of unfolding the cover 38, the horizontal rod 34 of the slide arm 32 is guided in a direction spacing from the external side of the windshield 12 by the protecting member 52 to get over the wiper 50, then the slide arm 32 extends upward closely along the external side of the windshield 12.

Figure 4:
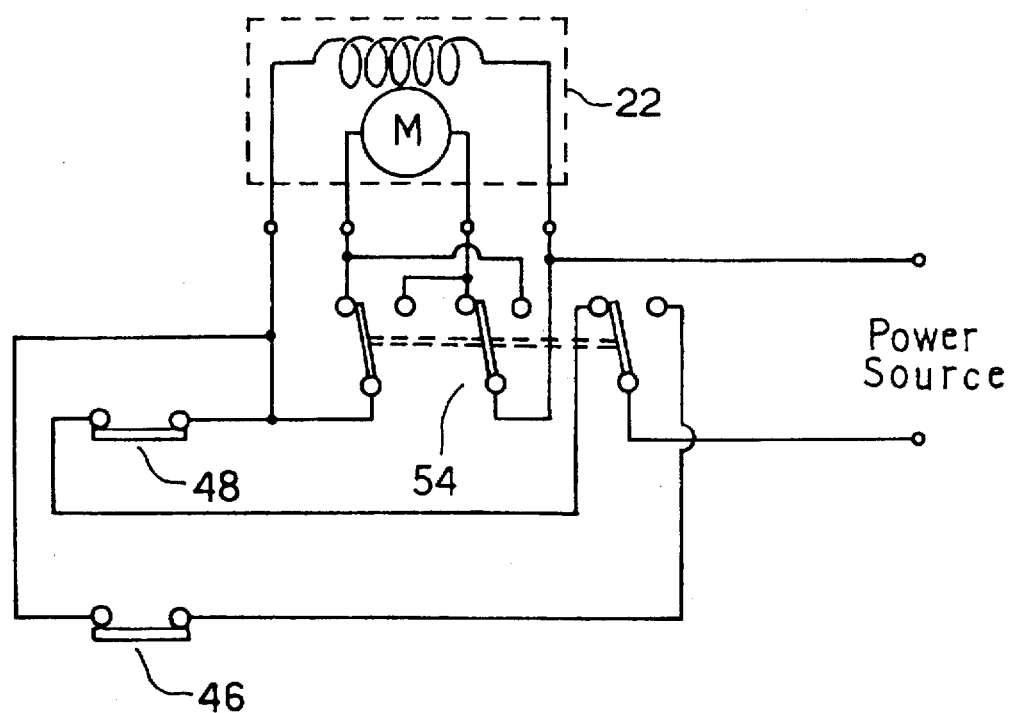
FIG. 4 is a wiring diagram showing electric system of the apparatus shown in FIGS. 1 and 2.

FIG. 4 is a wiring diagram showing electric system of the apparatus 10 for covering the windshield. For covering the windshield 12 with the cover 38 by operating the apparatus 10, first the switch is operated from inside the car to turn a three-throw switch 54 from ON shown in FIG. 4 to OFF. As a result, the rotary shaft of the motor 22 turns clockwise, and a power is transmitted to the slide arm 32 through the screw gear 24 and transmission disk 26, whereby the slide arm 32 moves linearly along the upper side of the mounting plate 14 and the external side of the windshield 12, and the front end of the slide arm 32 moves toward the upper part of the windshield 12. According to such a movement of the slide arm 32, the cover 38 of which front end is fixed to the front end of the slide arm is gradually unfolded. When the projection 44 on the rear end of the slide arm 32 comes in contact with the limit switch 48 to put it into action, the motor 22 is stopped. It is at this moment that most part of the windshield 12 is covered by the cover 38 as illustrated in FIG. 1.

For accommodating the cover 38 covering the windshield 12 on the back side of the bonnet, the switch is operated from inside the car, thereby turning the three-throw switch 54 from OFF to ON shown in FIG. 4. As a result, the rotary shaft of the motor 22 turns counter-clockwise and a power is transmitted to the slide arm 32 through the screw gear 24 and transmission disk 26, whereby the slide arm 32 moves linearly along the external side of the windshield 12 and the upper side of the mounting plate 14, and the front end of the slide arm 32 moves toward the lower part of the windshield 12. According to such a movement of the slide arm 32, the cover 38 of which front end is fixed to the front end of the slide arm is gradually folded. When the projection 42 on the front end of the slide arm 32 comes in contact with the limit switch 46 to put it into action, the motor 22 is stopped. It is at this moment that the cover 38 is completely removed from the windshield, and is accommodated in the accommodating member 40 on the back side of the bonnet.

Having described a specific embodiment of the invention, it is believed obvious that modification and variation of the invention is possible in light of the above teachings.

What is claimed is:

1. An apparatus for covering a windshield of a vehicle comprising:

a mounting plate located on a back side of a bonnet and fixed to the vehicle;

a cover capable of being unfolded and folded vertically on a windshield of the vehicle, and which is large enough to cover most of the windshield when unfolded;

an accommodating section attached to a front end of said mounting plate for accommodating said cover when folded;

a slide arm which is elongated along a vertical direction of the windshield and formed of a flexible material, a front end of the slide arm being fixed to a front end of said cover, the slide arm being supported for performing reciprocating motion freely in a longitudinal direction to move along an external side of the windshield and an upper side of said mounting plate;

arm drive means fixed to said mounting plate for moving said slide arm linearly in reciprocating motion; and a switch for driving said arm drive means from inside of the car.

2. An apparatus according to claim 1, wherein said arm drive means includes:

a transmission disk having a frictional transmission roller section and a rotary gear section, said frictional transmission roller section being rotatably supported on the upper side of the mounting plate so that the upper side of the mounting plate is orthogonal to an axis of rotation of the frictional transmission roller section, a periphery of the frictional transmission roller section being in contact and engaged with a part of the slide arm, and said rotary gear section being formed coaxially and integrally with said frictional transmission roller section;

a screw gear being engaged with said rotary gear section of the transmission disk; and a motor for driving said screw gear to turn forwardly and reversely.

3. An apparatus for covering a windshield of vehicles according to claim 1 further comprising a pair of limit switches for stopping the arm drive means respectively acting at unfolded and folded positions.

* * * * *